United States Patent
Viggiano

[11] Patent Number: 6,146,735
[45] Date of Patent: Nov. 14, 2000

[54] INFORMATION STORAGE DEVICE HAVING COATED METAL HUB

[75] Inventor: Anthony M. Viggiano, Wethersfield, Conn.

[73] Assignee: Component Technologies, Inc., Newington, Conn.

[21] Appl. No.: 08/941,948

[22] Filed: Oct. 1, 1997

Related U.S. Application Data

[60] Provisional application No. 60/027,790, Oct. 1, 1996.

[51] Int. Cl.[7] ........................................ G11B 5/66
[52] U.S. Cl. ................ 428/64.2; 428/65.3; 428/694 ST; 428/694 SG; 428/694 TR; 428/694 TM; 428/900; 427/128; 427/129; 427/130; 360/133; 360/135; 205/90; 205/119; 205/217
[58] Field of Search ................... 428/64.2, 65.3, 428/694 ST, 694 SG, 694 TR, 694 TM; 360/133, 135; 205/90, 119, 217; 427/128–130

[56] References Cited

U.S. PATENT DOCUMENTS

| | | | |
|---|---|---|---|
| 4,063,295 | 12/1977 | Mann et al. | 360/99.04 |
| 4,068,271 | 1/1978 | Kok | 360/97.02 |
| 4,244,788 | 1/1981 | Faulkner | 360/133 |
| 4,757,412 | 7/1988 | Iizuka et al. | 360/133 |
| 4,868,699 | 9/1989 | Kingsbury et al. | 360/128 |
| 4,910,625 | 3/1990 | Albrecht et al. | 368/135 |
| 4,967,184 | 10/1990 | Regelsberger | 340/572.8 |
| 5,289,456 | 2/1994 | Takahashi | 369/290 |
| 5,896,241 | 4/1999 | Hilton | 360/135 |

OTHER PUBLICATIONS

W. Riedel "Electroless Nickel Plating" ASM International (1991) pp. 1–159; 204–220; 261–281.
V.G. Shawnan et al. "Chemisch–Nickel Richtig Einsetzen," Galvinotechnik V. 73 N. 3 Mar. 1986, pp. 550–560.
J. Hajdu et al. "Comparison of Electroless Deposits for Electro–Magnetic Interference Shielding" Plating & Surface Finishing; pp. 42–44; (Jul. 1983).

*Primary Examiner*—Leszek Kiliman
*Attorney, Agent, or Firm*—C. G. Nessler

[57] ABSTRACT

A mini-floppy disk or like information storage device is comprised of a circle of data storage medium having a central metal hub. In use, the hub is contacted with and driven by a magnetized spindle. The hub comprises a ferromagnetic substrate and a metal coating. The coating has magnetization $B_s$ which is less than the magnetization of the substrate. The coating is harder than the substrate, preferably greater than 400 DPH hardness number. The coating is deposited with an amorphous microstructure while the substrate is crystalline. The coating has a nodular surface texture and surface oxide film which provides improved adhesive bond strength, where the medium is joined to the hub. The coating preferably is an electroless plating deposit, comprised of nickel or cobalt base metal, with phosphorous or boron additive; most preferably it is nickel-11% phosphorous.

22 Claims, 2 Drawing Sheets

INFORMATION STORAGE DEVICE HAVING COATED METAL HUB

This application claims the benefit of provisional application Ser. No. 60/027,790, filed Oct. 1, 1996, entitled "Hub for Information Storage Disk".

FIELD OF INVENTION

The present invention relates to data storage devices, in particular, hubs for mini-floppy disks used on personal computer systems.

BACKGROUND

Mini-floppy disks are used for electromagnetically storing information, particularly in personal computers. Typically, a disk comprises a circular piece of flexible plastic medium coated with magnetic material encased in a rigid plastic housing. Adhered to the center of the flexible plastic medium is a circular cupped metal hub. The hub typically has one or more openings, including a square hole in the center and an off-center hole for a drive pin. In use, the hub is engaged by mating features of a rotating drive spindle of the computer system disk drive. Thus, the disk storage medium is continuously rotated past magnetic heads of the disk drive. Such disks and drives are described Chapter 13 of the book authored by S. Mueller, "Upgrading and Repairing PCs", 4th Ed. (1994) Que Corporation, Indianapolis, Ind., the disclosure of which is hereby incorporated by reference.

To enable mini-floppy disks to be frequently inserted and removed from the disk drive system, the drive spindle automatically advances and retracts along an axis perpendicular to the hub and disk. Since probability dictates that the drive spindle contoured end and hub holes usually will not align, as the drive spindle pushes against the hub, it rotates until engagement occurs. In this process, there is metal to metal rubbing contact. The cumulative effect of such rubbing must not be such that galling or wear produce debris which would adversely affect the functioning of the finely crafted data storage surface of the disk.

To ensure positive engagement between the drive spindle and the hub during use, and to otherwise facilitate a desired smooth rotation of the flexible disk within the disk housing, the drive spindle is permanently magnetized and the hub is a magnetic metal. Thus, the hub is held against the end of the drive spindle during rotation. But, the magnetic attraction between the parts has to be sufficiently weak to both enable easy disengagement of the spindle from the hub and not interfere with the function of the data storage disk. Inasmuch as there are millions of floppy disk drives in the field, any improvement in disk or hub construction ought be compatible with the design of existing disks and disk drives, for commercial reasons. If not, disks with a new type hub could be either too weakly or too strongly attracted to the drive spindle, adversely affecting use of the whole floppy disk-drive system.

In addition to the above mentioned wear resistance and magnetic properties, the hub must have corrosion and oxidation resistance. A hub material reaction product which produces flaking or crumbling debris cannot be tolerated. And, a floppy disk hub must have a low cost and be attractive in appearance. The cost of a hub will depend on, among other things, the intrinsic material cost, formability, and other required processing.

The common material prevalently used in present day floppy disks is cold formed AISI Type 430 martensitic stainless steel, comprised essentially by weight percent 16 chromium, balance iron. Typically, a hub is about 0.012–0.013 inch thick. The Type 430 steel has a desired combination of magnetic property, wear resistance, corrosion resistance and formability. In comparison to many other iron base materials, Type 430 steel has a relatively high intrinsic cost.

Thus, in the continuous search for mini-floppy disk product improvement, there is most particularly a need to reduce cost while achieving equal or better function. However, any improved disk must have a hub which has magnetic properties compatible with the system which comprises the Type 430 hubs. The combination of performance requirements has prevented the use of what might seem to be likely engineering choices in other materials and combinations. The prevelance in the marketplace of relatively costly Type 430 steel, or like stainless steel grades, in hubs evidences this.

The mini-floppy disks described above are one type of removable information storage devices. The characteristics and requirements for mini-floppy disk hubs are shared to different degrees by other storage devices.

As will be described, the preferred embodiment of the present invention utilizes electroless nickel coatings. Such coatings have been in wide commercial use since the 1940's. They are applied from a liquid bath by means of autocatylic reaction and deposition. Electroless coatings, in particular nickel, sometimes overlaid with cobalt, have been long applied to the hard disks of computer systems. Such disks are typically made of aluminum, and they are coated with electroless nickel, typically having about 12 percent phosphorus, to protect the aluminum from corrosion and provide a suitable essentially non-magnetic surface for the information storage media.

SUMMARY

An object of the invention is to provide improved construction for floppy computer disks and similar mechanically-figured information storage devices. A further object is to provide a data storage device and a method of manufacture, where the device is a disk having a hub which is lower in cost than cold formed stainless steel hubs; with the related object that the hub has properties that are equal to or superior to such hubs, including resisting wear and corrosion or generating any adverse side effect on the data storage function, as a result of use. A still further object is to provide a data storage disk with an improved hub which is compatible with existing data storage devices.

In accordance with the invention, a data storage device has a hub comprised of a substrate having a first set of properties and a hub coating made of a material having a second set of properties. In particular, in the preferred invention, a metal hub comprises a first magnetization $B_s$ and a first hardness, while the coating material has a second magnetization which is less than that of the substrate; and the coating hardness is greater than the substrate hardness. Preferably, the substrate has a magnetization of at least about 14,000 Gauss and the coating is a metal which has a magnetization of less than about 3,000 Gauss and more than about 4 Gauss. The coating hardness is preferably more than DPH 220, more preferably greater than DPH 400, while the substrate hardness is less than DPH 250. Thus, in use, the coating creates a "magnetic gap" between the hub surface and the spindle which mates with and drives the hub. This tends to lower the force of attraction of hub to spindle, according to how the thickness is increased. At the same time, depending on the particular embodiment of the invention, the coating is paramagnetic. Also, at the same time the coating character otherwise inibits wear, as described below.

In further accordance with the invention, the preferred device has a substrate of a ferromagnetic metal, such as AISI Type 1010 or Type 430 steel. Such metals have a crystalline microstructure. The coating is an electroless deposit with an amorphous microstructure as deposited. The coating has a coefficient of friction which is less than the coefficient of friction of the substrate. The frictional engagement force of the spindle and hub are reduced by the combination of coating surface properties.

The preferred electroless deposit coating is comprised of the base metal selected from the group consisting of nickel and cobalt, and an additive selected from the group consisting of phosphorous and boron. Preferably, the coating is comprised of nickel base metal with 3–11 weight percent phosphorous; most preferably, the coating is nickel-11 percent phosphorous. Such base metals are galvanically noble with respect to steel substrates. For corrosion protection, the coating is greater than 50 microinches thick, preferably at least 75 microinches, up to 500 microinches.

The preferred nickel-phosphorous coating forms a natural oxide surface film which is comprised of substantial phosphorous; and the surface, by virtue of having been deposited as an amorphous material, has a nodular surface texture. This texture persists through normal heat treatments which may be used to change coating properties and which incidentally tend to make the microstructure crystalline. This combination of chemical and mechanical surface properties provides the desirable reduced friction properties mentioned above, and provides greater bond strength between the hub and the type of adhesive used to attach the data storage medium to the hub. The coating surface film is durable, practically colorless, and the hub has a pleasing bright metal appearance.

The invention provides a lower cost and more durable hub for a data storage disk which is used in combination with a magnetized spindle of a disk drive system. The invention can be applied to other types of information storage disk devices, for example those which comprise a rigid or semi-rigid data storage media, and those of the type used with optical devices.

The foregoing and other objects, features and advantages of the invention will become more apparent from the following description of the best mode of the invention and accompanying drawings.

DESCRIPTION

In this description, by "magnetic properties" is meant the response of a material to an electromagnetic field, as measured in typical magnetic material characterizations using commercial equipment. The response is typically displayed by a magnetization curve and hysteresis loop, where magnetizing force is plotted against magnetic flux density, or induction, B, is plotted against the corresponding magnetic intensity, H. Magnetic properties include magnetization, $B_s$, retentivity, $B_r$, and coercivity, $H_c$. While in this description the invention is to some extent analyzed and described as to some underlying phenomena, the invention itself is not conditioned on the validity of such. Unless otherwise indicated, reference to a type of material is reference to an AISI (American Iron and Steel Institute) Type; and, material composition is given in terms of weight percent. Electroless coatings are a species of generic electrochemical deposit. Electroless Nickel coatings are familiarly referred to as "EN". Typically, they are comprised of phosphorous or boron, leading to the designators herein of "EN—P" and "EN—B", respectively.

The preferred practice of the invention is described in terms of the floppy disk system described in the Background. A hub of the invention is preferably made from cold rolled mild steel, e.g., low carbon steel, such as AISI Type 1010 steel, comprised essentially of iron and 0.10 percent carbon. Type 1010 and other plain steels by themselves are susceptibile to corrosion and oxidation. By itself, Type 1010 steel is an unsuitable material. The preferred prior art material, AISI Type 430 martensitic stainless steel has the nominal composition 16Cr, 1Mn, 0.12C, <0.04P, <0.03S, balance Fe. Chromium imparts oxidation and corrosion resistance, and also lowers the magnetic properties, compared to mild steel. Both metals are ferromagnetic and compare with such metals as austentic stainless steels like AISI Type 304.

Figure 1:
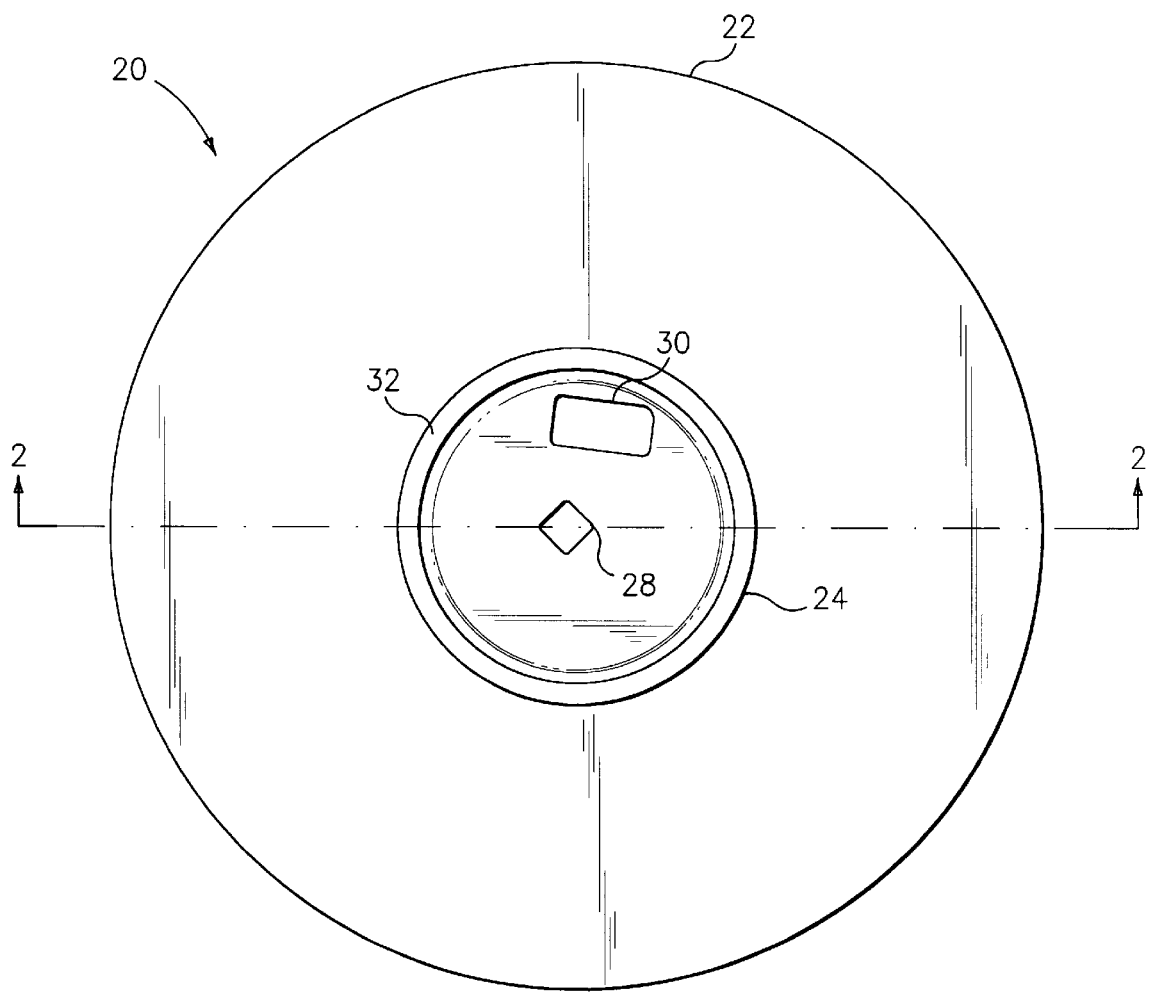
FIG. 1 is a planar view of a typical mini-floppy disk.

FIG. 1 shows a planar view of a mini-floppy disk 20. The disk is comprised of a cupped hub 24 at the center of a circle of 3–4 mil thick flexible plastic data storage medium 22. The medium 22 is adhesively bonded to the hub at a circumscribing small hub flange 32. See FIG. 2. The hub has a square central hole 28 and an off-center oblong drive hole 30. Typically, the hub is about 0.013 inch thick and has an outside diameter of about 1.06 inch.

Figure 2:
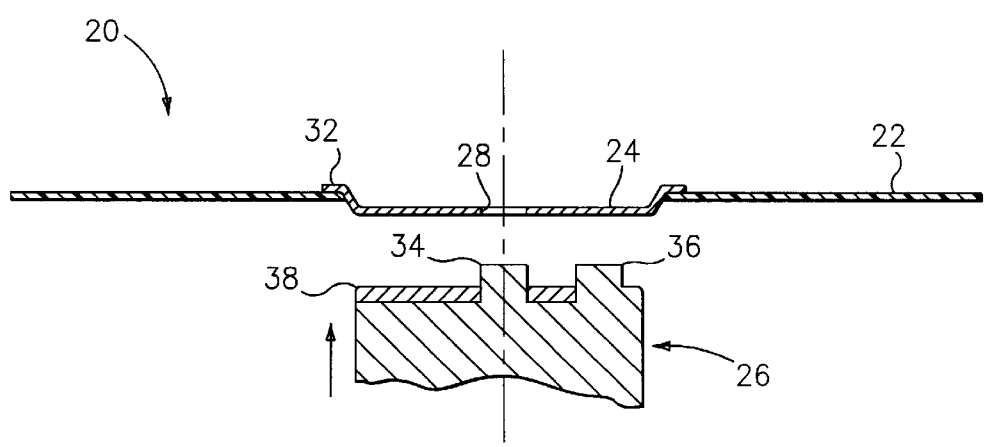
FIG. 2 is a diametrical cross section through the disk of FIG. 1.

FIG. 2 is a diametrical cross section of the disk 20. The disk is contained in a rigid plastic container, not shown, which positions the disk in space within the floppy disk drive of a computer. The Figure shows the upper end of a rotating steel spindle 26 as it approaches the convex surface of the cupped hub. This occurs automatically in the mini-floppy disk drive, when the disk is inserted. The spindle end is comprised of a central pin 34 and an outer drive pin 36 which mate with the holes in the hub. Typically, the spindle has a permanent magnet 38 on its end, adjacent to and or around the pins. The magnet pulls the hub toward the spindle, and holds it in contact therewith, when the spindle advances to near contact with the hub. Thus, it is the convex surface, or underside of the hub in the Figure, where the spindle makes rubbing contact, and where wear will take place.

In a preferred embodiment of the invention, a hub is formed by metal stamping from Type 1010 steel having a surface finish of about 10–30 microinch/inch arithmetic average. The hub is coated with a layer of electroless nickel, preferably Nickel with 10–12% Phosphorous. (Such coating is referred to herein as "Ni—P(11%)", reflective of the mean composition of 11 percent P. Other coatings have analogous designators based on the mean percentage of P. Ni—P(11%) is familiarly called a "high phos" coating.) In particular, a coating is applied using the commercial chemical bath No. 4855 (Fidelity Chemical Products Co., Newark, N.J., U.S.A.) based on sodium hypophosphite reducing agent. In the commercially known electroless nickel plating process, a part such as a Type 1010 steel hub is immersed into a plating bath solution. An autocatalytic reaction causes the deposition of a uniform layer of nickel deposit, with the thickness dependent generally on time of immersion. Hubs are mass plated and the coating is applied uniformly on all surfaces of the hub. For information about substrate preparation, baths, plating practice, and quality control, reference should be made to Chapters 3, 4, 7, 9 and 10 of the book by W. Riedel, "Electroless Nickel Plating", ASM International, Metals Park, Ohio (1991), the disclosure of which is hereby incorporated by reference.

As deposited, an EN coating has a characteristic amorphous structure. The coated hub is preferably used in the as-coated condition, but it may be heat treated, as known in the art, for improved hardness or other change in property. See discussion below.

Table 1 which shows bulk properties of as-deposited coating materials and substrates as measured by means of a Great Lakes brand Vibrating Specimen Magnetometer. As-deposited Ni—P(11%) (Fidelity 4855) material has substantially different magnetic properties from 1010 and 430 steels. In this discussion, the focus is on magnetization ($B_s$). The Table shows that other magnetic properties like Rententivity ($B_r$) and Coercivity ($H_c$) reflect the same heirarchial relationship between the materials, according to their greater or lesser comparative attraction to a magnet. Coatings produced from related Fidelity EN solutions, No. 4880 where the coating is called mid phos, or Ni—P(8%), and has 7–9%), and No. 4008 (where the coating is called low phos, or Ni—P(3%), and has 2–4% P) have similar properties to Ni—P(11%). They are paramagnetic but have significantly lower magnetization than either 1010 steel and 430 steel substrates. The EN coatings thus create a "magnetic gap" between the surface of the high magnetization steel substrate and the magnetized spindle. The coatings thus reduce the magnetic attractive force between the spindle and the hub, compared to what it would be in absence of the coating.

Figure 3:
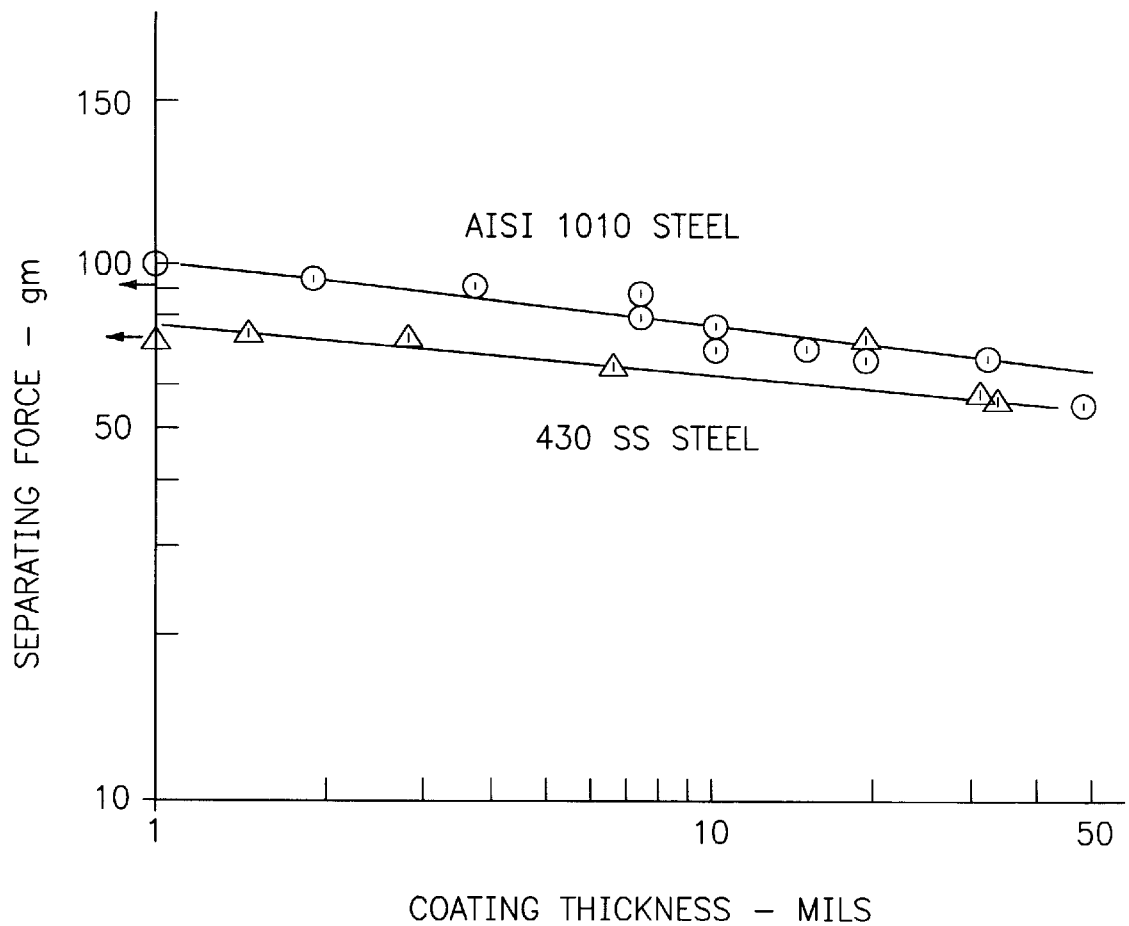
FIG. 3 is a graph showing how magnetization changes with coating thickness.

FIG. 3 shows the variation in the attractive force between a hub and spindle with coating thickness of 1–50 mils (0.001–0.050 inch) on typical 430 and 1010 steel substrate hubs. In the experimental measurement, hubs with non-magnetic coatings were contacted with a fixed flat circular ceramic magnet simulating a typical spindle. The force in grams necessary to separate the components, i.e., the attractive force, was measured. For test purposes, the magnet was chosen which produced a higher intensity, and higher attractive force, than typically characterizes a spindle. For example, the separation force for an uncoated 430 steel hub was around 70 gm, compared to around 20 gm for one representative commercial disk drive spindle. Comparable figures for 1010 steel were about 98 gm and 30 gm, respectively.

When mated with the test magnet, the uncoated 1010 steel hub produces about 33% more attractive force than the uncoated 430 steel hub. As expected, for either steel substrate, greater coating thickness reduces the attractive force, but perhaps less than might be expected. The data show that if the coating is thick enough, the magnetic attractive force of a spindle to a coated 1010 steel substrate hub can be matched with the force between the spindle and an uncoated 430 steel hub, although such thick coatings are not very economically practical. The principle that coatings decrease the attractive force according to the power relation illustrated by the log—log graph of FIG. 3 may be extrapolated to apply to coatings which are thin, i.e., less than one mil, where data measurement is more difficult owing to variability and comparatively small magnitude.

Table 1 shows that compared to steel substrates, all the as deposited EN-P coatings have low magnetic properties; i.e., they all provide an effect of the same sense. Other nickel containing coatings may be considered for steel substrates when they have comparable property sets, different from the steels. For example, commercial EN coatings having boron as an additive element instead of phosphorous may be used in the invention. The EN-B coatings have somewhat weaker magnetic properties than, EN-P. They and tend to be harder. As another example, electrolytic nickel coatings, such as commercial sulfamate nickel, shown in Table 1 also has low magnetic properties and in this respect is substitutional for the electroless coatings. Compared to as-deposited EN coatings, the electrolytic coatings will be crystalline.

TABLE 1

Comparative Nominal Properties of Bulk Materials

| Material | Magnetization ($B_s$) - Gauss | Retentivity ($B_r$) - Gauss | Coercivity ($H_c$) - Gauss | Hardness DPH |
|---|---|---|---|---|
| AISI 1010 steel cold rolled | 19,000 | 700 | −10 | 160 |
| AISI 430 steel cold rolled | 14,000 | 900 | −20 | 220 |
| No. 4008 Ni-P (3%) "low phos" | 2,420 | 380 | −47 | 500+ |
| No. 4880 Ni-P (8%) "mid phos" | 200 | 20 | −31 | 400–500 |
| No. 4855 Ni-P (11%) "hi phos" | 4 | 0.07 | 166 | 400–500 |
| Commercial electrolytic nickel | 330 | 0.04 | — | 175–210 |

The magnetic properties of any particular nominal composition EN coating can vary within a range, as they are sensitive to any variation in the solution and process parameters, over time and with location in the plating tank.

Heat treatment of a coated article might be incidental to other processing, e.g., coloring the coating, or it might be carried out to change the properties of the EN coating. Table 2 shows the effect of heat treatment on magnetization. As an example, an as-deposited Ni—P(11%) coating has an amorphous structure and is considered practically non-magnetic. On heat treating to a sufficient time/temperature, the Ni—P (11%) coating can be caused to partially or totally crystallize, to thus to become more paramagentic. Coatings of lesser P content, e.g., the low phos and mid phos coatings, tend to be magnetic as deposited but respond in the same general way, toward more magnetization when heat treated, as shown in Table 2. Thus, whether EN-P coatings are used in their as-deposited or treated condition, it is seen by comparing data in Tables 1 and 2 that the coatings have substantially lesser magnetic properties than Type 1010 or 430 steels.

TABLE 2

Comparative Magnetization of EN Coatings as a Function of Heat Treatment

| Coating Material | Magnetization ($B_s$) in Gauss for 1 hr Heat Treatment at | | |
|---|---|---|---|
| | None | 200° C. | 300° C. |
| No. 4008 Ni-P (3%) "low phos" | 2,670 | 2,880 | 3,070 |
| No. 4880 Ni-P (8%) "mid phos" | 280 | 540 | 1,300 |
| No. 4855 Ni-P (11%) "high phos" | 2.4 | 2.6 | 36 |

EN coatings are characterized by high hardness as shown by the typical data ranges in Table 1, as measured by an accepted procedure in terms of Diamond Pyramid Hardness ("DPH") Numbers, using a 500 g load. The hardness numbers are also referred to as Vickers numbers, and usually correspond with Knoop hardness numbers. Even higher hardness in EN coatings than indicated may be obtained through process and post-deposition treatment. It is seen that, compared to either 1010 or 430 steel, the EN coatings as a class are considerably harder. In the generality of the invention the coating will have a hardness number greater than that of the 1010 substrate, namely about 160. Preferably it will be at least 220 which is the hardness of the prevalently used Type 430 steel. More preferably, it will be higher, over 400. As mentioned elsewhere, the preferred EN coatings have other characteristics which inhibit wear, beyond hardness.

Since high material hardness is in general associated with low ductility, the softer substrate, preferably less than 250 in hardness, provides support for the relatively brittle coating.

The low magnetic properties of the EN coatings, by reducing the magnetic attraction between the spindle and the hub, reduce the normal force on the surface of the coating, when the spindle first engages and rotationally rubs on the hub. This reduces the tendency for wear from what it would be if the surface layer of the hub had a magnetic property set comparable to one of the steels. And, even if there is wear, and it results in any slight particles being created and discharged, they will be magnetic when the EN coating is to a degree magnetic, as are mid and low phos coatings, and heat treated hi phos coatings. Thus, particles will be attracted to the permanent magnet of the spindle, and prevented from floating onto the surface of the flexible part of the disk, compared to the lack of attraction that would occur with wear particles released from a coating comprised of such as epoxy, tin or zinc.

A typical EN coating with an amorphous microstructure has a desirable surface character compared to Type 1010 or 430 steel or electrolytic nickel, which have crystalline microstructure. An as-deposited EN-P coating tends to have a kind of natural lubricity and wear resistance, compared to a 1010 or 430 steel hub surface, even though the coating replicates the surface waviness of the steel substrate surface. In general, heat treatment improves coating wear resistance. An EN coating has a lower coefficient of friction when rubbed by the steel which comprises a spindle than does 430 or 1010 steel when rubbed similarly. Thus, the torsional resistive force which a shaft encounters on contacting and rubbing against an EN surfaced hub of a floppy disk will be less than it would be if the EN coating was not present.

The appearance of the surface of an EN coated hub is one of a bright metal. Upon exposure to ambient environment, EN-P coatings form stable thin protective surface films comprised of nickel oxide and phosphorus. Nickel phosphides are present. The presence of phosphorous in substantial quantity—compared for instance to the miniscule amount in Type 430 steel—contributes to the corrosion protection and tarnish resistance, which the EN coating provides. In this respect, the EN-P coatings are superior to the EN-B coatings; and Ni—11% P is most preferred. The EN surface film is not susceptible to flaking or generating dust.

Figure 4:
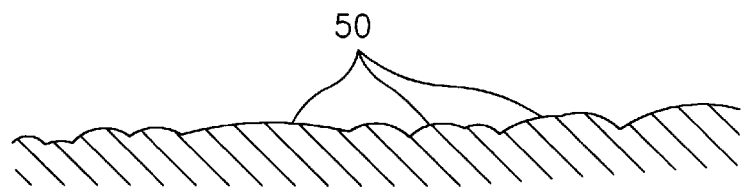
FIG. 4 is a schematic cross section of a coating showing the surface texture of an amorphous microstructure coating.
Figure 5:
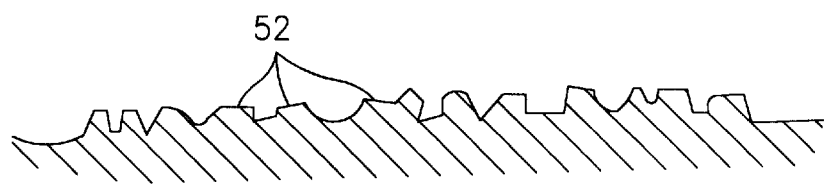
FIG. 5 is a schematic cross section of a coating showing the surface texture of a crystalline microstructure coating, such as electrolytic nickel.

An as-deposited EN coating surface forms a stronger bond with an adhesive (e.g., an epoxy resin or other hydrocarbon based adhesive), such as the kind used to adhere the floppy plastic storage medium to the hub flange. This is attributable to the character of the surface in two respects. First, there is the character of the naturally oxidized surface which was just discussed. Second, an EN plating, having been deposited as an amorphous material, tends to have a microscopic surface character which is comprised of low rounded protuberances, or nodules, 50, as shown in vertical cross section in FIG. 4, compared to the comparatively smaller, prismatic, and jagged crystallites 52 which typify the cross section of crystalline deposit, as shown by FIG. 5. The nodular surface character improves the wettability of the surface to species of petroleum-derived liquids, and thus adhesives of such or similar character come into better and more intimate contact with the EN coating surface. For a typical adhesive, the surface character of EN coating provides a hub-to-adhesive joint with about 30 percent more bond strength than is obtained when a steel substrate is uncoated with EN. This benefit offers the opportunity to substitute possible different adhesives or to change the size of the flange 32 shown in FIG. 2, depending on details of the failure mode of the joint between the medium 22 and hub 34.

In the preferred practice of the invention, coating thickness is about 50–500 microinch. More preferably the coating is at least about 75 microinch thick, to provide AISI 1010 steel substrate hubs with commercially suitable corrosion resistance. In particular, corrosion of substrate may occur due to the presence of micropores in the coating when the coating are too thin. The more the coating thickness is increased, the less presence is there of micropores which communicate with the vulnerable substrate. In relatively benign use environments coatings thinner than the minimum thickness may be useful. The protection provided by EN coatings is contrasted with the galvanic protection provided by coatings such as zinc, cadmium, or aluminum, in that nickel is galvanically more noble than substrates of steels.

Table 3 shows comparative substrate and EN coated 1010 steel hub corrosion resistance in a relatively severe test. The specimen weight loss was measured after immersion in static 1N hydrochloric acid solution at 80° C. for certain periods of time. It is seen how the Ni—P(11%) coating provides substantial protection to Type 1010 steel, greatly reducing corrosive weight loss compared to plain 430 and 1010 steels.

In a salt spray test, a 75 micro inch coating may have a life of about 15–20 hr, while a 500 micro inch coating may have a life of 500 hr. In de-ionized water humidity tests at 120° F. for 136 hr, 100 microinch thick Ni—P(11%) coated 1010 steel hubs showed no significant corrosion. For most commercial high humidity applications, the corrosion resistance of a 75 microinch thick Ni—P(11%) coated 1010 steel hub may be somewhat less than

TABLE 3

Comparative Corrosion Resistance in 1N Hydrochloric Acid Solution at 80° C.

| Material | Percent weight loss after immersion time of | | | |
| --- | --- | --- | --- | --- |
| | 30 min | 60 min | 90 min | 130 min |
| 1010 Steel | 11 | 25 | 36 | 50 |
| 430 Stainless Steel | 20 | 48 | 63 | 68 |
| 1010 Steel with 100 microinch Ni-P (11%) coat | 2.0 | 4.0 | 5.5 | 7.0 | that provided by uncoated 430 steel, but it is sufficient to meet requirements for typical mini-floppy disks. As mentioned elsewhere, Ni—P (11%) is most preferred for surface protection character. compared to EN with lesser phosphorus. Nonetheless, the EN coatings with lesser phosphorous are useful and superior, especially in comparison to the other coating and substrate choices which have been referred to in this description.

From the foregoing, EN will advantageously be used as a coating on martensitic steel hubs, e.g., 430 steel, as well as in combination with 1010 steel substrate. Of course, the 1010 steel is preferred for lower material cost. The material which comprises EN coatings is useful for hub applications when combined with a ductile and formable substrate material which has sufficient magnetic attraction for functioning in a disk drive system. That is, hubs formed from monolithic material which comprises the EN coating deposit are not practical.

The coatings of the present invention are distinguished from, and better than, other possible coatings in several respects. Common organic coatings, such as paints, epoxies, and other plastic resins, are non-magnetic and have low wear resistance. Still other metal coatings may be too expensive, or are not able to be deposited evenly. Hubs stamped from pre-coated metal sheet, such as zinc or nickel or tin plated steel, will have exposed edges which tend to corrode. Undesirable corrosion couples and galvanically induced currents at the exposed edges can result. Zinc and like materials tend to form undesirable corrosion products which are voluminous and friable; tin tends to grow "whiskers". Coatings which are galvanically sacrificial, such as zinc, and certain other metals, tend to be soft and result in excessive wear—and even galling, with the spindle. Any coatings that tend to wear will produce an unpleasing appearance. Depending on how they are applied, electrolytic coatings tend to have greater coating thickness near the hub outer periphery and hole edges, resulting in an uneven hub surface for mating with the spindle. The electrolytic coatings have crystalline microstructure. Commonly, they are not very hard as indicated in Table 1, although harder electrolytic nickel coatings can be obtained.

From the above, the following details various preferred aspects of the invention: A hub substrate has a first set of magnetic properties and first hardness. The hub has a metal coating with a second set of magnetic properties, wherein coating magnetization is less than that of the substrate; and the coating hardness is greater than the hardness of the hub, preferably at least DPH 220, more preferably at least Vickers DPH 400. Preferably, the magnetization is sufficient to cause the hub to be attracted to the spindle with a force nominally equal or greater than the force provided by an uncoated 430 hub. The coating in some embodiments is paramagnetic; in other embodiments, i.e., Ni—P(11%), the coating is practically diamagnetic. The hub has a crystalline ferromagnetic material, such as 1010 or 430 steel, while the coating preferably has an amorphous microstructure, less preferably, the coating is crystalline. The coating is comprised of a base metal selected from the metal group consisting of nickel and cobalt, and an additive selected from the element group consisting of phosphorous and boron. The coating is preferably EN, more preferably EN-P, most preferably Ni—P (11%). The coating thickness is preferably between 50 and 500 microinches, most preferably about 75 microinches. The coating provides the hub with a lower coefficient of friction when rubbed by the steel spindle than characterizes the substrate of the hub. The hub has no exposed substrate edges. The coating has an adherent oxide surface which contains substantial phosphorous. An economic and technically useful information storage device is provided by one or more of the above combinations.

In the generality of the invention, a wear resistant electroless coating, preferably electroless nickel ("EN") comprising phosphorous, is put on a steel hub of a mini-floppy computer data storage disk. In the claimed invention a reference to EN is meant to include coating type which are generally substitutional in the art for EN-P. For example, included are EN-boron and electroless cobalt. A disk with a coated hub is used in combination with a magnetized spindle of a disk drive system, as previously described. The invention can be applied to other types of information storage disk devices, for example those which comprise a rigid or semi-rigid data storage medium, or those the type used with optical devices. The hub substrate may comprise mild steel or stainless steel or other ferromagnetic material. For corrosion protection, a hub is preferrably coated all over. However, where corrosion is not an issue, the EN coating may be placed only on the surface of the hub which is contacted by the rotating spindle. While an EN coating by itself is generally sufficient, optionally an intermediate or pre-treatment coating may be deposited of the hub substrate prior to the EN coating, for example, electrolytic nickel on rough surfaces.

Although only the preferred embodiment has been described with some alternatives, it will be understood that further changes in form and detail may be made without departing from the spirit and scope of the claimed invention.

I claim:

1. An information storage device for use in a disk drive system wherein one face of a hub of the device is releasably engaged and driven by the magnetized end of a rotating spindle which creates an attractive force between the spindle and the hub, comprising:

a central hub comprised of a substrate having a first set of magnetic properties and a first hardness;

a circular disk of information storage medium attached to and running around the central hub; and, a coating on said substrate, the coating comprised of a material having a second set of magnetic properties different from said first set, and a second hardness greater than said first hardness;

wherein the magnetization $B_s$ of the coating material is less than the magnetization $B_s$ of the substrate.

2. The device of claim 1 wherein the substrate is ferromagnetic and the coating is essentially nonmagnetic, the coating having an amorphous metallic microstructure.

3. The device of claim 1 wherein the coating is an electroless nickel deposit.

4. The device of claim 1 wherein the substrate is a metal having a crystalline microstructure and the coating is a metal having an amorphous microstructure, the coating having a hardness greater than about DPH 220.

5. The device of claim 1 wherein the substrate is a ferromagnetic metal and the coating is paramagnetic nickel deposit having a hardness greater than about DPH 400.

6. The device of claim 1 wherein the substrate is made of a ferromagnetic metal having a magnetization $B_s$ of at least about 14,000 Gauss; and wherein the coating is made of a metal having a magnetization $B_s$ of less than about 3,000 Gauss.

7. The device of claim 6 wherein the coating has a hardness greater than about DPH 400.

8. The device of claim 1, wherein the hardness of the coating is greater than about DPH 220; and, wherein the hardness of the substrate is less than about DPH 250.

9. The device of claim 1 wherein the coating is a metal deposit consisting essentially of a base metal selected from the group consisting of nickel and cobalt, and an additive element selected from the group consisting of phosphorous and boron.

10. The device of claim 9 wherein the base metal is nickel; and wherein the additive material comprises 3–11 nominal weight percent phosphorus.

11. The device of claim 3 wherein the coating has a thickness in the range 50–500 microinches.

12. The device of claim 1 wherein the information storage device is a mini-floppy disk.

13. The device of claim 1 wherein the information storage device hub substrate is comprised of steel; wherein, the hub has a flange to which is attached by adhesive bonding the circular disk of information storage medium; wherein, the hub substrate has a coating comprised of an electroless nickel deposit; the coating having a surface comprising an adherent oxide layer containing substantial phosphorous; the coating surface increasing the strength of the adhesive bonding, compared to the strength of the adhesive bonding of said disk to an uncoated steel substrate hub.

14. The device of claim 13 further characterized by said coating surface having a nodular texture typical of a coating which is deposited with an amorphous microstructure.

15. An information storage device which comprises a circular disk of information storage medium having a central hub, for use in a disk drive system wherein one face of the hub is releasably engaged and driven by the magnetized end of a rotating spindle which creates an attractive force between the spindle and the hub, comprising:

a hub comprising a ferromagnetic steel substrate having a first magnetization, a first hardness, and a crystalline microstructure; and, a coating on the substrate, the coating having a second magnetization which is substantially less than the first magnetization, a second hardness substantially greater than the first hardness, wherein the coating has a surface comprised of an adherent oxide film and containing substantial phosphorous and nodules substantially characteristic of an amorphous electroless plating deposit.

16. The device of claim 15 wherein the coating has an amorphous microstructure and contains more than 10 weight percent phosphorous.

17. The device of claim 16 wherein the coating has a crystalline microstructure and contains more than 3 weight percent phosphorous.

18. The device of claim 15 wherein the attractive force between the end of the spindle and the hub creates a frictional force resisting relative rotation of the spindle to hub during engagement thereof, wherein the combination of coating surface character and lesser coating magnetization, reduces said frictional force from the force which is present when the substrate is uncoated.

19. The method of making an information storage disk which comprises:

forming a hub-shaped substrate of a steel material having a first magnetization;

depositing a coating of nickel base metal and phosphorous additive on the substrate, the coating having a nodular surface characteristic of an amorphous deposit;

wherein the magnetization of the coating is less than said first magnetization, and wherein the surface of the deposit forms an oxide containing substantial phosphorous; and, bonding the substrate to the center of a disk of information storage medium.

20. The method of making an information storage disk comprising:

forming a hub-shaped substrate of a steel material;

depositing a coating comprised of amorphous non-magnetic nickel on the substrate;

converting the coating to a magnetic material by heating the coated substrate;

wherein the magnetization of the coating is less than the magnetization of the substrate; and, bonding the substrate to the center of a disk of information storage medium.

21. The method of preventing corrosion and attenuating wear on a metal hub of an information storage disk which has a magnetized drive spindle which comprises:

forming a hub substrate having a first magnetization; and, coating the hub with a coating which has less magnetization than the first magnetization, the coating having a magnetization greater than about 4 Gauss; wherein any coating wear particulate are paramagnetic in sufficient degree to be attracted to the magnetized spindle.

22. The method of claim 21 wherein the coating is harder than the substrate, is galvanically more noble than the substrate, and contains phosphorous.

* * * * *